(12) United States Patent
Fernandes et al.

(10) Patent No.: US 7,538,151 B2
(45) Date of Patent: May 26, 2009

(54) COATING COMPOSITIONS AND METHODS OF COATING SUBSTRATES

(75) Inventors: Luciane Guaraldi Fernandes, Jacarei (BR); Daneile Christina Almeida Hummel Pimenta Santos, Jacarei (BR)

(73) Assignee: Rohm and Haas Company, Philadelphia, PA (US)

( * ) Notice: Subject to any disclaimer, the term of this patent is extended or adjusted under 35 U.S.C. 154(b) by 350 days.

(21) Appl. No.: 11/209,209

(22) Filed: Aug. 22, 2005

(65) Prior Publication Data

US 2007/0043151 A1    Feb. 22, 2007

(51) Int. Cl.
    C08K 5/17    (2006.01)
(52) U.S. Cl. ........................ 524/236; 524/823
(58) Field of Classification Search .................. 524/236, 524/823
    See application file for complete search history.

(56) References Cited

U.S. PATENT DOCUMENTS

| | | | |
|---|---|---|---|
| 4,363,893 A | 12/1982 | Hersh | |
| 4,486,489 A | 12/1984 | George et al. | |
| 4,497,919 A | 2/1985 | Varga | |
| 4,517,330 A | 5/1985 | Zdanawski | |
| 4,820,773 A | 4/1989 | Alexander et al. | |
| 5,149,745 A | 9/1992 | Owens | |
| 5,239,028 A | 8/1993 | Nakagawa et al. | |
| 5,264,242 A | 11/1993 | Speer | |
| 5,527,853 A | 6/1996 | Landy | |
| 5,672,379 A | 9/1997 | Schall | |
| RE36,042 E | 1/1999 | Landy et al. | |
| 5,861,188 A | 1/1999 | Schall | |
| 5,869,569 A * | 2/1999 | Arai et al. | 524/823 |
| 5,922,398 A | 7/1999 | Hermes | |
| 6,013,721 A | 1/2000 | Schall | |
| 6,075,079 A | 6/2000 | Helmer | |
| 6,207,742 B1 | 3/2001 | Boldt | |
| 6,361,768 B1 | 3/2002 | Galleguillos et al. | |
| 6,413,011 B1 | 7/2002 | Sobczak | |
| 6,475,556 B1 | 11/2002 | Sobczak | |
| 6,645,552 B1 | 11/2003 | Schall | |
| 6,706,836 B1 | 3/2004 | Holguin et al. | |
| 6,734,226 B2 * | 5/2004 | Hermes | 523/172 |
| 7,091,275 B1 | 8/2006 | Amick | |
| 2002/0151648 A1 * | 10/2002 | Fasano et al. | 525/71 |
| 2005/0137326 A1 | 6/2005 | Sanfilippo | |

FOREIGN PATENT DOCUMENTS

| | | |
|---|---|---|
| AU | 200025185 | 10/2000 |
| EP | 0 337 744 | 10/1989 |
| EP | 0 322 188 | 10/1992 |
| EP | 0594321 * | 4/1994 |
| EP | 0 798 350 | 1/1997 |
| JP | 09324145 A * | 12/1997 |

* cited by examiner

*Primary Examiner*—Bernard Lipman
(74) *Attorney, Agent, or Firm*—Carl P. Hemenway

(57) ABSTRACT

There is provided an aqueous composition comprising (a) at least one anionically stabilized latex polymer, (b) at least one polyfunctional amine, and (c) at least one volatile base; wherein said polymer (a) has Tg of 21° C. or higher. Also provided are methods for coating leather and for coating elastomer comprising the step of applying to said leather or said elastomer at least one layer of an aqueous coating composition comprising (a) at least one anionically stabilized latex polymer, (b) at least one polyfunctional amine, and (c) at least one volatile base.

19 Claims, No Drawings

COATING COMPOSITIONS AND METHODS OF COATING SUBSTRATES

BACKGROUND

It is often desirable to coat a substrate by applying to that substrate an aqueous coating composition that dries relatively rapidly. One means of achieving this end is disclosed in Australian Patent Application 200025185 A1, which describes the electromagnetic energy assisted curing of an aqueous coating that includes an anionically stabilized latex polymer with Tg of 0° C. or higher, a volatile base, and a polyfunctional amine. Also desirable are coatings that form a glossy coat on the substrate. Further desirable are coating compositions that include at least one polymer with relatively high glass transition temperature.

STATEMENT OF THE INVENTION

In a first aspect of the present invention, there is provided an aqueous composition comprising (a) at least one anionically stabilized latex polymer, (b) at least one polyfunctional amine, and (c) at least one volatile base; wherein said polymer (a) has Tg of 21° C. or higher.

In a second aspect of the present invention, there is provided a method for coating leather comprising the step of applying to said leather at least one layer of an aqueous coating composition comprising (a) at least one anionically stabilized latex polymer, (b) at least one polyfunctional amine, and (c) at least one volatile base.

In a third aspect of the present invention, there is provided a method for coating elastomer comprising the step of applying to said elastomer at least one layer of an aqueous coating composition comprising (a) at least one anionically stabilized latex polymer, (b) at least one polyfunctional amine, and (c) at least one volatile base.

DETAILED DESCRIPTION

As used herein, an "aqueous" composition is any composition that is 25% or more by weight water, based on the total weight of the composition.

A "polymer", as used herein and as defined by F W Billmeyer, J R. in *Textbook of Polymer Science*, second edition, 1971 ("Billmeyer") is a relatively large molecule made up of the reaction products of smaller chemical repeat units. Normally, polymers have 11 or more repeat units. Polymers may have structures that are linear, branched, star shaped, looped, hyperbranched, or crosslinked; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymers have relatively high molecular weights. Polymer molecular weights can be measured by standard methods such as, for example, size exclusion chromatography or intrinsic viscosity. Generally, polymers have number-average molecular weight (Mn) of 1,000 or more. Polymers may have extremely high Mn; some polymers have Mn above 1,000,000; typical polymers have Mn of 1,000,000 or less.

A polymer is normally made by one or more chemical reactions, known collectively as polymerization, of relatively small molecules, known as monomers. After polymerization, the residues the monomers are the repeat units (also known herein as "polymerized units") of the polymer.

As used herein, "(meth)acrylate" means acrylate or methacrylate, "(meth)acrylamide" means acrylamide or methacrylamide, and "(meth)acrylic" means acrylic or methacrylic. As used herein, "(meth)acrylate monomer" means any monomer that is any one of the following: (meth)acrylic acid, esters of (meth)acrylic acid, amides of (meth)acrylic acid, substituted versions thereof, and mixtures thereof. As used herein, an "acrylic polymer" is a polymer, the polymerized units of which contain 40% or more residues of (meth) acrylate monomers by weight, based on the total weight of the polymer.

Some polymers exist in the form of a latex, which is a suspension of polymer particles in an aqueous medium. The aqueous medium contains 25% or more water by weight, based on the weight of the aqueous medium; in some embodiments, the aqueous medium contains 50% or more water, or 75% or more water, by weight, based on the weight of the aqueous medium. Some latices are naturally occurring, and some are synthetic. Synthetic latices are normally made by emulsion polymerization.

The practice of emulsion polymerization is discussed in detail in D. C. Blackley, Emulsion Polymerization (Wiley, 1975). For example, the monomers may be emulsified with anionic or nonionic dispersing agents; about 0.5% to 10% thereof on the weight of total monomers being used. A polymerization initiator of the free radical type, such as, for example, ammonium or potassium persulphate, may be used alone or in conjunction with an accelerator, such as, for example, potassium metabisulphate or sodium thiosulphate. The initiator and accelerator (if used), commonly referred to as catalysts, may conveniently be used in proportions of 0.5% to 2% each based on the weight of monomers to be copolymerized. The polymerization temperature may for example be from room temperature (approximately 20° C.) to 90° C., or more, as is conventional.

Examples of emulsifiers which are suited to the emulsion polymerization process include, for example, alkaline metal and ammonium salts of alkyl, aryl, alkyl-substituted aryl and aryl-substituted alkyl sulphonates, sulphates and polyether sulphates, such as sodium vinyl sulphonate, and sodium methallyl sulphonate; the corresponding phosphates and phosphonates, such as phosphoethyl methacrylate; and alkoxylated fatty acids, esters, alcohols, amines, amides and alkylphenols.

Chain transfer agents, including, for example, mercaptans, polymercaptans and polyhalogen compounds, are sometimes used in the polymerization mixture to control polymer molecular weight.

Any of the various types of emulsion polymerization may be used. For example, a "single stage" emulsion polymerization is sometimes used, in which the monomer mix, sometimes in emulsified form, is either added all at once to the reaction container or is added gradually to the reaction container during the polymerization reaction. Alternatively, in some embodiments, a "multi-stage" emulsion polymerization is used, in which the monomer mix is provided as two or more portions (which may have the same composition as or different compositions from each other); after each portion is polymerized, all or part of the resulting polymer is kept in or is placed into a vessel, and a subsequent portion of monomer mix is added to that vessel and polymerized.

Some latices are anionically stabilized, which means that most or all of the particles have at least one anionic species on the surface of the particle or attached to the surface of the particle. Some anionically stabilized latices have one or more anionic surfactants on the surface of one or more of the particles. Anionic surfactants are surfactants that contain at least one anionic functional group. One or more anionic surfactants may be introduced into a latex before, during, or after the polymerization process, or any combination thereof. Some anionically stabilized latices may contain more than one anionic surfactant.

Some anionically stabilized latices contain particles that contain at least one polymer with pendant anionic functional groups. For example, a polymer may be made from monomers that include at least one monomer that has at least one carboxyl functional group; at least one carboxyl functional group may remain intact after the polymerization process; and the carboxyl group may exist after polymerization as a carboxylate anion. Similarly, a polymer may be made from monomers that include at least one monomer that has at least one anionic functional group other than carboxyl, or a mixture of monomers with carboxyl functional groups and other anionic groups.

Some anionically stabilized latices contain polymers with anionic functional groups and also contain one or more anionic surfactants.

As used herein, an "anionically stabilized latex polymer" is a polymer that exists in the form of an anionically stabilized latex.

A "polyfunctional amine," as used herein, is a compound with two or more amine groups that are capable of assuming a protonated state at low pH in an aqueous medium.

A "volatile base," as used herein, is a base that is soluble in water; that, when added to an aqueous coating composition, remains in the aqueous coating composition under normal storage conditions; and that evaporates from the aqueous coating composition under conditions suitable for drying that aqueous coating composition.

A "carboxyl functional" moiety, as used herein, is a moiety with a carboxyl group attached. The carboxyl group may either be in the form of a neutral carboxylic acid group, in the form of a carboxylate anion, in the form of a carboxylate salt, in the form of a complex with a metal atom, or in any combination thereof.

A "polyvalent metal cation," as used herein, is a metal cation with valence of +2 or higher. The metal may be any type of metal, including, for example, alkaline earth metals and transition metals. The polyvalent metal cation may be in the form of a solvated cation, part of a salt, part of a complex, or in another cationic form.

A "substrate," as used herein, is any surface to which a coating may be usefully applied. The surface of the substrate may be flat, smooth, rough, planar, curved, irregular, or any combination thereof. Substrates may be rigid, flexible, thick, thin, or any combination thereof.

As used herein, "leather" means any natural leather or any synthetic leather. Natural leather is made from hides or skins of animals; usually, such hides or skins are processed, for example by one or more processes including, for example, salting, curing, tanning, and other processes. Synthetic leathers are materials that are man-made and can be used for one or more of the purposes for which natural leather is used, such as, for example, making one or more of the following: shoes, apparel, hats, luggage, sports equipment, handbags, briefcases, and other articles for which the properties of natural leather are useful. Types of synthetic leather include, for example, coated fabrics and other man-made leathers. Coated fabrics may employ one or more fabrics made of natural fibers, synthetic fibers, or a mixture or combination thereof. Coated fabrics may employ one or more fabrics that are woven, nonwoven, or a combination thereof. Coated fabrics may be coated with polyvinyl chloride, polyurethane, other synthetic materials, or a combination thereof. Other man-made leathers are made of synthetic materials that mimic the properties of natural leather; some man-made leathers are made partly or wholly of polyurethane.

"Elastomer" is defined, for example, by Billmeyer. As used herein, elastomers are materials that stretch under tension to a new length that is generally at least 1.1 times their original length and may be many times their original length; elastomers exhibit relatively high strength and stiffness when stretched; after deformation, elastomers tend to recover their original shapes relatively quickly, with relatively little residual permanent deformation. For purposes of the present invention, materials exhibiting most or all of these characteristics will be considered "elastomers." Elastomers can be made from a wide variety of materials, such as for example natural rubbers, synthetic rubbers, and blends thereof. Synthetic rubbers include, for example, polybutadiene, neoprene, butyl rubber, polyisoprene, nitrile rubbers, styrene butadiene rubbers (also called SBRs), ethylene propylene diene based rubbers (some of which are called EPDM), derivatives thereof, modified versions thereof, mixtures thereof, and the like. Elastomers include both thermoplastic elastomers (also called elastoplastics or melt-processable rubbers) and crosslinked (also called vulcanized) elastomers. Some elastomers include one or more additives, including, for example, fillers, antioxidants, oils, waxes, and the like.

As used herein, the "Tg of a polymer" means the glass transition temperature of that polymer itself, in the absence of other ingredients such as plasticizers, coalescents, softeners, fillers, other polymers, etc. When the Tg of a polymer is a certain value, that polymer is said herein to "have" Tg of that value. The Tg of a polymer may be measured by differential scanning calorimetry (DSC) using the midpoint method. Also, the Tg of a polymer may be calculated by the "Fox equation," taught by T. G. Fox (Bulletin of the American Physical Society, vol. 1, series II, number 3, Mar. 15, 1956, p. 123), when each amount of each monomer used to make that polymer is known. It is contemplated that some polymers (such as, for example, some block polymers and some multistage latex polymers) have more than one Tg; as used herein, unless stated otherwise, when a polymer is said to have a certain Tg, that polymer may or may not have other Tg's.

Some latex polymers are crosslinkable and some are not. As used herein, a latex polymer is "crosslinkable" if it is capable of undergoing crosslinking during the removal of water, after the removal of water, or both during and after the removal of water. The crosslinking may be any interaction that results in the usual effects of crosslinking on polymers. Crosslinking may involve the formation of covalent bonds, the formation of ionic bonds, the formation of metal-organic complexes, other interactions, or any combination thereof.

"Alkyl" groups as used herein are aliphatic hydrocarbon groups with no double bonds. Alkyl groups may be straight, branched, cyclic, or any combination or mixture thereof.

The practice of the present invention involves the use of at least one anionically stabilized latex polymer, referred to herein as polymer (a). Polymer (a) may have any Tg. In some embodiments, polymer (a) has Tg of −80° C. or higher, or −55° C. or higher, or 0° C. or higher. In some embodiments, polymer (a) has Tg of 21° C. or higher, or 25° C. or higher. In some embodiments, all of the anionically stabilized latex polymers in the composition of the present invention will have Tg lower than 21° C. In some embodiments, all of the anionically stabilized latex polymers in the composition of the present invention will have Tg of 21° C. or higher. Independently, in some embodiments, the composition includes at least one anionically stabilized latex polymer that has Tg of 21° C. or higher and that has no additional Tg that is lower than 21° C. Independently, also contemplated are embodiments in which, in addition to at least one polymer with Tg of 21° C. or higher, the composition of the present invention also includes at least one anionically stabilized latex polymer that has Tg of lower than 21° C., or at least one anionically stabilized latex polymer that has Tg of 15° C. or lower.

Compositions of the present invention contain at least one polyfunctional amine. Any compound that meets the definition of polyfunctional amine stated herein above is suitable. Some examples of compounds that are suitable as polyfunctional amines are polymeric polyfunctional amines (i.e., polymers that are polymerized from monomer mixtures that contain one or more amine-containing monomers). Some of the suitable polymeric polyfunctional amines are homopolymers and some are copolymers; among the copolymers, some are copolymers that are polymerized from monomer mixtures in which all the monomers are amine-containing monomers, and some are copolymers that are polymerized from monomer mixtures in which some of the monomers are amine-containing and some of the monomers are not amine-containing. Among the suitable polymeric polyfunctional amines are polymers that are polymerized from monomers that include, possibly among other monomers, one or more monomers selected from the following seven classes.

Class 1: aminoalkyl vinyl ethers and aminoalkyl vinyl sulfides. The alkyl groups have two or three carbon atoms. The nitrogen of the amino group may be primary, secondary, or tertiary. One or more alkyl, hydroxyalkyl, or alkoxyalkyl group with one to four carbon atoms may be attached to the nitrogen atom of the amino group. Some examples of class 1 compounds include beta-amino vinyl ether, beta-amino vinyl sulfide, N-monomethyl-beta-amino vinyl ether or sulfide, and N-monomethyl-beta-aminopropyl vinyl ether or sulfide.

Class 2: (meth)acrylamide esters and (meth)acrylic esters, where the ester group contains at least one amino group. Some examples of class 2 compounds include dimethylaminoethyl (meth)acrylate, (meth)acryloxyethoxyethylamine, beta-aminoethyl (meth)acrylate, and N-beta-aminoethyl (meth)acrylamide.

Class 3: N-(meth)acryloxyalkyl-oxazolidines and N-(meth)acryloxyalkyltetrahydro-1,3-oxazines, including analogs in which the "alkyl" portion is replace by alkoxyalkyl or poly(alkoxyalkyl). Some examples include oxazolidinylethyl (meth)acrylate.

Class 4: monomers that readily generate amines by hydrolysis such as, for example, (meth)acryloxy-ketimines and (meth)acryloxy-aldimines.

Class 5: non-polymeric polyfunctional amines that have at least 2 primary or secondary amino groups. Some class 5 compounds have 2 to 10 primary or secondary amino groups. Some class 5 compounds have aliphatic groups (linear, branched, cyclic, or a combination thereof) with 2 to 100 carbon atoms. Some examples of class 5 compounds include hexamethylene diamine, 2-methyl pentamethylene diamine, and polyoxypropylene amines.

Class 6: imine monomers. Imine monomers are polymerizable compounds that have either a carbon-nitrogen double bond or else have a heterocyclic ring with a carbon-nitrogen bond. Imine monomers are sometimes co-polymerized with alkene monomers such as, for example, ethylene or propylene.

Class 7: vinylamine monomers. Vinylamine monomers are monomers in which a single carbon atom is attached both to another carbon atom by a double bond and to a nitrogen atom by a single bond. The carbon atoms and the nitrogen atom may be further attached to hydrogen atoms, organic radicals, substituted organic radicals, or any combination thereof. Suitable vinylamine monomers include, for example, unsubstituted vinylamine, N-substituted vinylamine, and N,N-disubstituted vinylamine.

In some embodiments, the polyfunctional amine of the present invention is a copolymer that is polymerized from one or more monomers selected from the seven classes discussed herein above in addition to one or more other monomers. In some embodiments, the other monomers include alkyl (meth)acrylate monomers, (meth)acrylamide, other ethylenically unsaturated monomers, and mixtures thereof. Some suitable other ethylenically unsaturated monomers include, for example, alkyl (meth)acrylates where the alkyl group has 1 to 18 carbon atoms, styrene, substituted styrenes, vinyl acetate, butadiene, ethylene, substituted versions thereof, and mixtures thereof.

In some embodiments, the polyfunctional amine of the present invention is a polymer formed by solution polymerization in an aqueous medium. In some of such embodiments, the polymeric polyfunctional amine is soluble in water.

In some embodiments, the polyfunctional amine of the present invention is a polymer formed by emulsion polymerization in an aqueous medium. In some of such embodiments, the resulting polymeric polyfunctional amine is an anionically stabilized latex polymer.

When the polyfunctional amine is an anionically stabilized latex polymer, in some embodiments it will be a separate polymer from anionically stabilized latex polymer (a). Also contemplated are embodiments in which the polyfunctional amine is an anionically stabilized latex polymer that serves as both ingredient (a) and ingredient (b) in the compositions of the present invention.

In the practice of the present invention, various combinations of types of anionically stabilized latex polymer (a) with types of polyfunctional amine (b) are contemplated. A few embodiments are, for example, the following:

Embodiment I: (a) and (b) are separate moieties; (b) is a water-soluble polymer; (a) may or may not have residues of carboxyl functional monomer; and (b) may or may not have carboxyl functional groups.

Embodiment II: (a) and (b) are separate moieties; (b) is a latex polymer; (a) may or may not have residues of carboxyl functional monomer; and (b) may or may not have residues of carboxyl functional monomer.

Embodiment III: (a) and (b) are the same moiety, which may or may not have residues of carboxyl functional monomer.

Compositions of the present invention, before they are applied to substrate, are maintained under conditions in which all or nearly all the amine groups in the polyfunctional amine are in a deprotonated state (i.e., the amine groups are uncharged, also referred to as neutral or neutralized). In some embodiments, such conditions are established by maintaining the pH of the composition at a value that is high enough to make sure that all or nearly all the amine groups are deprotonated. In some embodiments, such pH values are established by the addition of one or more bases such as, for example, ammonia, alkali metal hydroxide, alkyl amines, morpholine, or a mixture thereof.

Compositions of the present invention contain at least one volatile base. One useful volatile base is, for example, ammonia. In some embodiments, the only base or bases used are volatile. In other embodiments, at least one volatile base is used in addition to at least one non-volatile base such as, for example, one or more alkali metal hydroxides. It is contemplated that the amount of base present in the composition is sufficient to make sure that the amine groups in the polyfunctional amine are deprotonated. It is further contemplated that the amount of non-volatile base (if any is present) in the composition is low enough that, if the volatile base were removed, the pH of the composition would be low enough that some or all of the amine groups in the polyfunctional amine would become protonated. While the present invention is not limited to any particular mechanism, it is also contemplated that, when the volatile base evaporates during or after the drying process, the pH of the composition becomes low enough that some or all of the amine groups in the polyfunctional amine become protonated.

The polymer (a) of the present invention may have any composition. Some suitable polymers are, for example, polyurethanes, polyesters, polyamides, cellulosic polymers, polyolefins, styrene-containing polymers, acrylic polymers, copolymers thereof, and mixtures thereof. In some embodiments, polymers other than polyurethane polymers are suitable. In some embodiments, acrylic polymers are suitable.

Among embodiments in which at least one polymer (a) is an acrylic polymer, suitable acrylic polymers include, for example, acrylic polymers that include residues of one or more of the following monomers: (meth)acrylic acid, amides of (meth)acrylic acid, alkylol-substituted amides of (meth)acrylic acid, alkyl esters of (meth)acrylic acid, and substituted-alkyl esters of (meth)acrylic acid. Suitable acrylic polymers include, for example, those with polymerized units of one or more alkyl acrylate monomers with alkyl groups of 1 to 18 carbon atoms, one or more alkyl methacrylate monomers with alkyl groups of 1 to 18 carbon atoms, one or more vinyl aromatic monomers, methacrylic acid, one or more substituted-alkyl (meth)acrylate monomers, and one or more other vinyl monomers. Substituted-alkyl (meth)acrylate monomers are alkyl (meth)acrylate monomers with one or more functional groups attached to the alkyl group; suitable functional groups include, for example, alkene groups; nitrogen-containing groups such as amine groups (including mono- and di-alkyl amine groups); oxygen-containing groups such as, for example, hydroxyl groups, carbonyl groups, carboxyl groups, maleic groups, acetoacetoxy groups, and alkoxy groups; sulfur-containing groups; and combinations and mixtures thereof.

Vinyl aromatic monomers are monomers that include at least one ethylenically unsaturated group and at least one aromatic ring. Some examples of vinyl aromatic monomers include, for example, styrene and alkyl-substituted styrene (such as, for example alpha-methyl styrene).

Some acrylic polymers suitable as polymer (a) include, for example, acrylic polymers that include no residues of (meth)acrylic acid. Other acrylic polymers suitable as polymer (a) include, for example, acrylic polymers that include residues of (meth)acrylic acid. In some embodiments, residues of methacrylic acid are present. In some embodiments, the amount of residues of (meth)acrylic acid is 0.1% or more; or 0.5% or more; or 2% or more; or 5% or more; by weight based on the weight of polymer (a). In some embodiments, the amount of residues of (meth)acrylic acid is 50% or less; or 30% or less; or 20% or less; by weight based on the weight of polymer (a).

As used herein, "weight of polymer" means the weight of the polymer when dry, after removal of any solvent or suspending medium.

Some acrylic polymers suitable as polymer (a) include, for example, acrylic polymers that include residues of one or more alkyl (meth)acrylates. In some embodiments, residues of methyl methacrylate are present. In some embodiments, residues of butyl acrylate are present. In some embodiments, the amount of residues of alkyl methacrylate monomers is 1% or more; or 2% or more; or 4% or more; or 5% or more; by weight based on the weight of polymer (a). In some embodiments, the amount of residues of alkyl methacrylate monomers is 50% or less; or 40% or less; or 30% or less by weight based on the weight of polymer (a). Independently, in some embodiments, the amount of residues of alkyl acrylate monomers is 1% or more; or 2% or more; or 5% or more; or 10% or more; by weight based on the weight of polymer (a). In some embodiments, the amount of residues of alkyl acrylate monomers is 80% or less; or 60% or less; or 50% or less by weight based on the weight of polymer (a).

Some acrylic polymers suitable as polymer (a) include, for example, acrylic polymers that include no residues of monomers other than (meth)acrylate monomers. Other acrylic polymers suitable as polymer (a) include, for example, acrylic polymers that include one or more residues of monomers other than (meth)acrylate monomers, such as, for example, styrene, alpha-methyl styrene, other substituted styrenes, butadiene, other olefins, vinyl halides, vinylidene halides, vinyl acetate, and mixtures thereof. Styrene is one suitable monomer that is not a (meth)acrylate monomer. In some embodiments, the amount of residues of monomers other than (meth)acrylate monomers is 5% or more; or 10% or more; or 20% or more; by weight based on the weight of polymer (a). In some embodiments, the amount of residues of monomers other than (meth)acrylate monomers is 80% or less; or 60% or less; or 50% or less;

by weight based on the weight of polymer (a).

In some embodiments, the composition of the present invention contains, in addition to ingredients (a), (b), and (c), at least one polymer, herein called "(d)," that is an anionically stabilized latex polymer that has Tg of less than 21° C. In some embodiments, polymer (d) contains at least one polymer that has Tg of 15° C. or less. Independently, in some embodiments, polymer (d) contains at least one polymer that has Tg of less than 21° C. and that has no additional Tg that is above 21° C.

The polymer (d) of the present invention may have any composition. Some suitable polymers are, for example, polyurethanes, polyesters, polyamides, cellulosic polymers, polyolefins, styrene-containing polymers, acrylic polymers, copolymers thereof, and mixtures thereof. In some embodiments, polymers other than polyurethane polymers are suitable. In some embodiments, acrylic polymers are suitable.

Among embodiments in which polymer (d) contains at least one acrylic polymer, the types of monomers and the specific monomers that are suitable for including and excluding as polymerized residues of polymer (d) are the same as those stated herein above for polymer (a). In some embodiments, polymer (d) contains polymerized residues of one or more of one or more alkyl (meth)acrylate esters, one or more (meth)acrylic acid, and one or more other monomers. In some embodiments, each of the polymerized residues of polymer (d) is either an alkyl (meth)acrylate ester or is (meth)acrylic acid.

In some embodiments, the amount of residues of (meth)acrylic acid in polymer (d) is 0.05% or more; or 0.1% or more; or 0.5% or more; by weight based on the weight of polymer (d). In some embodiments, the amount of residues of (meth)acrylic acid in polymer (d) is less than 8%; or less than 5%; by weight based on the weight of polymer (d).

In some embodiments, the amount of residues of alkyl methacrylate monomers 30 in polymer (d) is 2% or more; or 5% or more; or 10% or more; or 25% or more; by weight based on the weight of polymer (d). In some embodiments, the amount of residues of alkyl methacrylate monomers in polymer (d) is 80% or less; or 70% or less; or 60% or less by weight based on the weight of polymer (d). Independently, in some embodiments, the amount of residues of alkyl acrylate monomers in polymer is (d) 2% or more; or 5% or more; or 10% or more; or 20% or more; by weight based on the weight of polymer (d). In some embodiments, the amount of residues of alkyl acrylate monomers in polymer (d) is 80% or less; or 70% or less; or 60% or less by weight based on the weight of polymer (d).

In some embodiments, the composition of the present invention contains no anionically stabilized latex polymer that is crosslinkable. In other embodiments, the composition of the present invention contains one or more anionically stabilized latex polymers that are crosslinkable. Among embodiments in which the composition contains one or more anionically stabilized latex polymers that are crosslinkable, the crosslinkable anionically stabilized latex polymers may have any Tg. In some of such embodiments, the composition contains at least one anionically stabilized latex polymer that has Tg of 21° C. or higher. Independently, in some of such embodiments, the composition contains at least one anionically stabilized latex polymer that has Tg of less than 21° C. Independently, in some of such embodiments, the composition contains at least one anionically stabilized latex polymer that has Tg of less than 21° C. and also contains at least one anionically stabilized latex polymer that has Tg of 21° C. or higher.

Suitable crosslinkable anionically stabilized latex polymers include those, for example, that have chemical groups (herein called "dry-reactive" chemical groups) that do not react while the polymer is suspended in latex form and that react during or after the evaporation or removal of water from the latex. When such chemical groups react, they participate in chemical reactions that create effective crosslinks. Such chemical reactions may occur, for example, under any one or more of the following conditions: drying in an ambient atmosphere at ambient temperature (15° C. to 40° C.); exposure to elevated temperature (higher than 40° C., or higher than 50° C., or higher than 100° C.); contact with oxygen; exposure to radiation (such as, for example, infrared, visible, ultraviolet, or electron beam); or any combination thereof.

In some embodiments in which the composition contains one or more anionically stabilized latex polymers that are crosslinkable, the crosslinking is capable of taking place at temperature of 40° C. or lower. Independently, in some embodiments in which the composition contains one or more anionically stabilized latex polymers that are crosslinkable, the crosslinking is capable of taking place without the application of radiation. Independently, in some embodiments in which the composition contains one or more anionically stabilized latex polymers that are crosslinkable, the crosslinking is capable of taking place at ambient conditions. When crosslinking is capable of taking place at ambient conditions, enhanced conditions are not required to achieve useful crosslinking; it is contemplated that, while enhanced conditions are not required, crosslinking may be improved (i.e., crosslinking may occur faster, or may progress to a greater extent) if the layer of the composition is exposed to enhanced conditions.

For example, some crosslinkable anionically stabilized polymers contain dry reactive groups (herein called "self-reactive" groups) that are capable of reacting with each other to form crosslinks. Such self-reactive dry-reactive groups include, for example, quaternary ammonium halide groups; acetoacetate functional groups that have been reacted with amino-functional silanes; other silane functional groups; N-alkanol amide groups; and combinations thereof.

In some embodiments that contain one or more crosslinkable anionically stabilized latex polymers, the composition of the present invention additionally contains another compound, known herein as a "crosslinking agent," which is a compound capable of interacting with two or more dry-reactive chemical groups to form an effective crosslink. A wide variety of appropriate combinations of dry-reactive chemical groups with crosslinking agents are known. Some examples are the following: quaternary ammonium groups with a mixture of amines and epoxy resin; carboxylic acid groups with a variety of crosslinking agents (including, for example, polyvalent metal ions, epoxy resins, carbodiimides, polycarbodiimides, aziridines, and combinations thereof); acetoacetate or acetoacetamide groups with amino silanes or cobalt salts or oxidizable compounds; aldehyde or ketone groups with polycarboxylic acids, bis-hydrazides, or bis-hydrazones; and isocyanate reactive groups (such as, for example, hydroxyl, amine, urethane, or epoxide) with polyisocyanates. One suitable combination is carboxylic acid groups with polyvalent metal ions.

In embodiments that use polyvalent metal ions, any metal cation with valence +2 or higher is suitable. Some suitable polyvalent metal ions include, for example, polyvalent ions of calcium, magnesium, arsenic, mercury, cobalt, iron, copper, lead, cadmium, nickel, chromium, aluminum, tungsten, tin, zinc, zirconium, and mixtures thereof. In some embodiments, one or more polyvalent ions of zinc, copper, magnesium, or mixtures thereof are used. In some embodiments, polyvalent zinc ion is used. In some embodiments, polyvalent magnesium ion is used.

Also contemplated as suitable crosslinkable anionically stabilized latex polymers are polymers that employ two different dry-reactive groups that react with each other to form a crosslink. The two different dry-reactive groups may be on different polymer chains or they may be on the same polymer chain.

In some embodiments, the composition of the present invention contains one or more further ingredients, also called "adjuvants." For example, some embodiments contain one or more of the following: antifoaming agent (including, for example, silicone emulsions), leveling agent (including, for example, fluorocarbon compounds), plasticizer, wax (including, for example, polyalkylene wax emulsions), rheology modifier, solvent, cosolvent, dye, and pigment (including, for example, carbon black).

Among embodiments in which plasticizers are used, suitable plasticizers include volatile plasticizers (sometimes called coalescents) and non-volatile plasticizers. Plasticizers suitable in the present invention include, for example, alcohols, ether compounds, carboxylate esters, phosphate esters, amides, and mixtures thereof.

Some alcohols suitable as plasticizers include, for example, aliphatic alcohols with 2 to 10 carbon atoms. Some suitable alcohols are, for example, isopropanol, butanol, 2-ethylhexanol, and pine oil.

Some ether compounds suitable as plasticizers are, for example, alkyl and aromatic ethers of monoalkylene glycols and multialkylene glycols. Some suitable alkyl ethers of multialkylene glycols are, for example, diethylene glycol ethyl ether, dipropylene glycol methyl ether, and mixtures thereof. Further ether compounds suitable as plasticizers are, for example, ether alcohols, which are compounds containing at least one ether link and at least one hydroxyl group. Some suitable ether alcohols are, for example, 2 butoxy ethanol and butyl carbitol.

Another group of compounds suitable as plasticizers are carboxylate esters, which are compounds containing at least one carboxylate ester link.

Some carboxylate esters suitable as plasticizers are, for example, esters of mono-hydroxyl compounds and monocarboxylic acids; mono- and di-esters of mono-hydroxyl compounds and monocarboxylic acids; mono- and di-esters of polyols and monocarboxylic acids; multi-esters of multicarboxylic acids and polyols; and combinations and mixtures thereof. Carboxylic acids suitable as portions of plasticizers include, for example, aromatic and aliphatic carboxylic acids, including, for example, carboxylic acids with 4 to 12 carbon atoms. Suitable carboxylic acids include, for example, benzoic acid, alkyl carboxylic acids with 4 to 8 carbon atoms, phthalic acid, trimellitic acid, oxalic acid, fumaric acid, maleic acid, adipic acid, pimelic acid, and mixtures thereof. Hydroxyl compounds suitable as portions of plasticizers include, for example, straight or branched alkyl mono-hydroxyl or polyol compounds with 3 to 13 carbon atoms. Some examples of suitable esters are the following: Texanol™ (from Eastman Chemical), mono- and di-alkyl esters of isooctane diol, mono- and di-alkyl esters of butane diol, and mixtures thereof.

Some phosphate esters suitable as plasticizers are, for example, trialkyl phosphates (such as, for example, tri-2-ethylhexyl phosphate), triaryl phosphates (such as, for example, tricresyl phosphate), mixed alkyl/aryl phosphates (such as, for example, 2-ethylhexyl diphenyl phosphate), trialkoxyalkyl phosphates (such as, for example, tributoxyethyl phosphate), combinations thereof, and mixtures thereof.

One suitable amide plasticizer is, for example, caprolactam.

Mixtures of suitable plasticizers are also suitable.

Among embodiments in which one or more rheology modifier is included in the composition of the present invention, suitable rheology modifiers include, for example, non-ionic rheology modifiers and ionic rheology modifiers. Non-ionic rheology modifiers include, for example, water soluble materials such as, for example, hydroxyethyl cellulose, other water-soluble celluloses, and water-soluble synthetic polymers such as, for example, polyethers. Non-ionic rheology modifiers also include, for example, materials sometimes known as "associative thickeners," which are hydrophobically modified hydrophilic molecules. Hydrophilic portions of associative thickeners include, for example, hydrophilic polyurethanes, ethoxylated polyurethanes, hydroxyethyl cellulose, other water-soluble celluloses, poly(ethylene oxide), and other hydrophilic polyethers. The hydrophobic groups of associative thickeners may be attached to the hydrophilic portion by any type of bond, including, for example, urethane linkages. Hydrophobic groups in associative thickeners include, for example, hydrocarbons with 6 or more carbon atoms, fluoro-substituted hydrocarbons with 3 or more carbon atoms and at least one fluorine atom, organosiloxane-containing organic radicals, and combinations and mixtures thereof.

Among the suitable ionic rheology modifiers are, for example, synthetic polymers with amine groups, acid groups, or both. Such synthetic polymers include, for example, polymers made from monomer mixtures that include one or more amine-containing (meth)acrylate monomers (such as, for example, (meth)acrylamide) and, optionally other monomers, including, for example, one or more non-amine-containing (meth)acrylate monomers. Synthetic polymers suitable as ionic rheology modifiers also include, for example, polymers made from monomer mixtures that include one or more acid-containing (meth)acrylate monomers (such as, for example, (meth)acrylic acid) and, optionally other monomers, including, for example, one or more non-acid-containing (meth)acrylate monomers (which may be monoethylenically unsaturated or multiethylenically unsaturated or a mixture thereof).

Also suitable as ionic rheology modifiers are hydrophobically modified synthetic polymers made from monomer mixtures that include at least one amine-containing monomer or at least one acid-containing monomer. The hydrophobic group may be attached, for example, by including, in the monomer mixture from which the hydrophobically modified synthetic polymer is made, one or more monomers with hydrophobic groups (i.e., a hydrocarbons with 6 or more carbon atoms, fluoro-substituted hydrocarbons with 3 or more carbon atoms and at least one fluorine atom, organosiloxane-containing organic radicals, or combinations thereof); such polymers include, for example, copolymers made from monomer mixtures that include (meth)acrylic acid, C10-C20 alkyl (meth)acrylates, optionally multiethylenically unsaturated (meth)acrylates, and other (meth)acrylates.

The ingredients in the composition of the present invention may be combined in any order, using any method of mixing. In some embodiments, for example, at least one polymer (a) is mixed with at least one polyvalent metal cation to form a mixture herein called "(a)/metal premix" that does not contain ingredients (b), (c), and (if used) polymer (d). In such embodiments, in some cases, the polyvalent cation may be, for example, mixed with the anionically stabilized latex polymer using any one or more of the following methods.

Method M1: supplying the polyvalent metal cation as an oxide. In method M1, the polyvalent metal oxide is mixed with the latex polymer. In some cases, a basic salt of an alkaline metal is also added.

Method M2: supplying the polyvalent metal cation as a complex. In Method M2, some suitable complexes include, for example, carbonates, bicarbonates, and glycinates. In some embodiments using Method M2, it is useful to solubilize such a complex prior to adding it to an aqueous polymer dispersion. One method to solubilize such a complex is to add the complex to dilute aqueous ammonia.

Method M3: mixing the polyvalent metal cation with the anionically stabilized latex polymer while the anionically stabilized latex polymer is at a temperature above its Tg. In some embodiments using Method M3, the polyvalent metal cation, just prior to mixing with the latex polymer, is in the form of a compound that is relatively insoluble in water (i.e., solubility of less than 0.4 grams of compound per 100 grams of water). In some embodiments using Method M3, the compound containing the polyvalent metal cation is mixed with the latex polymer while the latex polymer emulsion has pH of 7 or greater.

It is contemplated that, in the practice of embodiments involving the use of (a)/metal premix, that (a)/metal premix will be mixed with other ingredients to form composition of the present invention.

Independently, in some embodiments, ingredients (b), (c), and (if used) (d) are mixed together to form a mixture, herein called "(b)/(c) premix," that does not contain polymer (a). In some embodiments, the (b)/(c) premix contains at least one polymer (d). It is contemplated that, in the practice of embodiments involving the use of (b)/(c) premix, that (b)/(c) premix will be mixed with other ingredients to form composition of the present invention.

In some embodiments, the composition of the present invention is formed by mixing together at least one (a)/metal premix and at least one (b)/(c) premix. In such embodiments, it is contemplated that volatile base may be added to either premix (before, during, or after formation of that premix), volatile base may be added to the composition simultaneously with the two premixes, volatile base may be added to the composition after the premixes are mixed together, or any combination thereof. If any adjuvants are used in such embodiments, they may be added to either premix (before, during, or after formation of that premix), they may be added to the composition simultaneously with the two premixes, they may be added to the composition after the premixes are mixed together, or any combination thereof.

In some embodiments, a mixture is formed that contains one or more polymer (a), one or more ingredient (b), one or more ingredient (c), and, if polymer (d) is present, one or more polymr (d); and the mixture contains no polyvalent metal ions (other than minute traces of polyvalent metal ions that may be present as impurities). In some of such embodiments, polymer (a) includes residues of (meth)acrylic acid. In some of such embodiments, after the mixture of (a), (b), (c), and, optionally, (d) is formed, one or more polyvalent metal ions is added to the mixture. When polyvalent metal ion is added, it may be added by any method, including, for example, the methods described herein above for formation of (a)/metal premix. It is contemplated in such embodiments that, if any adjuvants are used, they may be added together or separately at any stage of the formation of the composition, including before, during, or after the addition of polyvalent metal ion, or any combination thereof.

In the practice of the present invention, one or more layers of the composition of the present invention may be applied directly to the substrate, or one or more layers of the composition of the present invention may be applied to the substrate after a previous coating has already been applied to the substrate. After one or more layers of the composition of the present invention is applied to the substrate, the coated substrate may be used without application of further coatings, or, alternatively, further coatings (which may or may not be compositions of the present invention) may be applied.

Layers of the composition of the present invention may be usefully applied to any substrate. Substrates may be, for example, thick or thin, rigid or flexible, natural or synthetic, porous or non-porous, or any combination thereof. Some examples of substrates include wood, metal, concrete, terrazzo, granite, other minerals, rocks, non-resilient flooring materials, ceramic tile, plastic tile, leather, paper, cardboard, asphalt, plastics, elastomers, or any combination thereof. In some embodiments, at least one substrate is leather (including, as discussed herein above, leather that is natural or synthetic, that is previously coated or uncoated, or any combination thereof). In some embodiments, at least one substrate is elastomer, such as, for example, automobile tires.

To apply one or more layers of the composition of the present invention to a substrate, any method may be used. In some embodiments, one or more layers are applied by hand. In some embodiments in which the layer is applied by hand, the composition may, for example, be spread with a non-absorptive device such as, for example, a wire-wound rod, a metering bar, a spatula, squeegee, or similar device. In some embodiments in which the layer is applied by hand, the composition may, for example, be spread with an absorptive device, often called an "applicator," such as, for example, devices that include an absorptive material such as, for example, sponge, woven fabric, nonwoven fabric, or similar material. The layer of the composition of the present invention may be applied by hand with the aid of conventional paint-applying tools such as, for example, brushes and rollers. In some embodiments, the layer may be applied using methods that employ one or more mechanical device; such methods include, for example, conventional or airless spray, roll, curtain, mechanical brush, flood, and dip-coating methods.

In some embodiments, the composition of the present invention forms a film after a layer of the composition is applied to a substrate, during or after the drying of the layer. A film is desirably cohesive; that is, during normal use for the intended purpose, the film does not readily break into pieces. Also, a film desirably does not readily lose attachment to the substrate.

In some embodiments, a layer of the composition of the present invention is capable of drying rapidly. In some cases, the layer is initially wet, then tacky, then dry. A layer is tacky when a person touching the coating with a finger perceives that the layer is sticky. A layer is considered dry when it is no longer tacky. For some uses of the present invention, the drying is performed at ambient temperature in an ambient atmosphere, and rapid drying is desirable. In some embodiments, the layer becomes dry in 20 minutes or less, or 10 minutes or less.

The compositions of the present invention include both volatile and non-volatile ingredients. Volatile ingredients are those that evaporate during the process of drying a layer of the composition. Water and volatile base are considered herein to be volatile; the composition may or may not contain one or more additional volatile ingredients. Nonvolatile ingredients do not evaporate during the process of drying a layer of the composition. Polymers and polyfunctional amines are considered herein to be non-volatile; the composition may or may not contain one or more additional non-volatile ingredients. In some embodiments, the amount of non-volatile ingredients, by weight, based on the total weight of the composition, is 2% or more; or 5% or more; or 10% or more. In some embodiments, the amount of non-volatile ingredients, by weight, based on the total weight of the composition, is 70% or less; or 50% or less; or 40% or less.

In some embodiments, the amount of weight of polymer (a), based on the total weight of the composition, is 1% or more; or 3% or more; or 8% or more. In some embodiments, the amount of weight of polymer (a), based on the total weight of the composition, is 30% or less; or 20% or less; or 15% or less.

In some embodiments, the amount of the weight of polyfunctional amine (i.e., the weight of the polyfunctional amine itself, in the absence of water, solvents, and other ingredients), based on the total weight of the composition, is 0.01% or more, or 0.1% or more. In some embodiments, the amount of the weight of polyfunctional amine (i.e., the weight of the polyfunctional amine itself, in the absence of water, solvents, and other ingredients), based on the total weight of the composition, is 5% or less, or 2% or less.

In some embodiments, one or more polymer (d) is present. In some of the embodiments in which polymer (d) is present, the amount of weight of polymer (d), based on the total weight of the composition, is 0.5% or more; or 1% or more; or 2% or more. In some of the embodiments in which polymer (d) is present, the amount of weight of polymer (d), based on the total weight of the composition, is 30% or less; or 20% or less; or 10% or less.

In some embodiments in which at least one polymer with dry-reactive groups is used and a crosslinking agent is also used, the ratio of crosslinking agent to dry-reactive groups, on an equivalents basis, is 0.05 or more, or 0.1 or more, or 0.2 or more, or 0.4 or more. In some embodiments in which a polymer with dry-reactive groups are used and a crosslinking agent is used, the ratio of crosslinking agent to dry-reactive groups, on an equivalents basis, is 1.5 or less, or 0.9 or less.

It is to be understood that for purposes of the present specification and claims that the range and ratio limits recited herein can be combined. For example, if ranges of 60 to 120 and 80 to 110 are recited for a particular parameter, then the ranges of 60 to 110 and 80 to 120 are also contemplated. For another example, if minimum values for a particular parameter of 1, 2, and 3 are recited, and if maximum values of 4 and 5 are recited for that parameter, then it is also understood that the following ranges are all contemplated: 1 to 4, 1 to 5, 2 to 4, 2 to 5, 3 to 4, and 3 to 5.

EXAMPLES

In the examples, the following methods were used:

Applying a Coating to Leather

Leather was cut into test pieces 30 cm by 20 cm and flattened. Each test piece of leather is then stuck to a horizontal surface with double-faced tape. A sponge applicator is weighted to obtain its tare weight, and then 1 ml of liquid coating is applied to the sponge applicator with a pipette. The applicator is placed in the upper left corner of the test piece, and it is moved quickly up and down repeatedly, always in contact with the test piece, while it is also moved slowly from left to right. When the entire test piece has been covered, the applicator is place again in the upper left corner and then moved quickly left and right repeatedly, always in contact with the test piece, while it is also moved slowly form top to bottom. Then the applicator is again placed on the upper left corner and pulled to the bottom of the test piece while in contact with the test piece; the applicator is lifted and placed next to the first position and pulled down; then lifted and pulled down next to the previous position until the test piece has been covered. The entire coating process is performed quickly, before the coating layer dries.

After day drying at room temperature and ambient atmosphere, the coating process is repeated. After another day drying at room temperature and ambient atmosphere, the coating process is repeated again.

Gloss

Gloss was measured with a Gardner Glossmeter, following the procedure of ASTM D523 (American Society for Testing and Materials, West Conshohocken, Pa., USA), reported in Gloss Units. The 60° gloss is measured three times: after the first coat is dry but before the application of the second coat; after the second coat is dry but before the application of the third coat; and after the third coat is dry. 8 readings are taken: 4 horizontal and 4 vertical, and the readings are averaged.

Leveling

After the coating process is complete but before the coating is dry, an "X" is drawn in the wet surface with the sponge applicator. After the coating is dry, the appearance of the "X" is rated as follows: Excellent (no "X" is visible); Very Good (faint outline of "X" is visible but there are no ridges in the film); Good (plain outline of "X" is visible but there are no ridges in the film); or Regular (plain outline of "X" is visible and there are ridges in the film).

Time to Dry

As described herein above, the time required for the coating to become non-tacky is recorded.

| Ingredient | Solids (%)[1] | Description | Supplier |
|---|---|---|---|
| SE-21 | 10 | anti-foam silicone emulsion | Wacker |
| Zonyl ™ FSJ fluorocarbon | 40 | leveling agent | DuPont |
| Diethylene glycol ethyl ether | 100 | plasticizer | commodity |
| Tributoxy ethyl phosphate | 100 | plasticizer | commodity |
| Latex polymer X | 47 | anionically stabilized; by Fox equation, Tg > 20° C.; contains no poly-functional amine and no polyvalent metal ion | Rohm and Haas Co. |
| Polymer D1 | 50 | anionically stabilized; by Fox equation, Tg < 15° C.; also contains poly-functional amine and volatile base | Rohm and Haas Co. |
| Polymer A1 | 38 | anionically stabilized; by Fox equation, Tg > 30° C.; also contains poly-valent metal ion | Rohm and Haas Co. |
| Polymer A2 | 36 | anionically stabilized; by Fox equation, Tg > 25° C.; also contains poly-valent metal ion | Rohm and Haas Co. |
| A-C 350N | 35 | polyethylene wax emulsion | Honeywell |
| Carbon Black | 40 | dispersion | S. C. Johnson |
| Nonionic Rheology Modifier | 20 | Associative Thickener | Rohm and Haas Co. | note
[1]Solids percent by weight of ingredient shown, as supplied by the supplier Examples 1-3 and Comparative Example C The following aqueous coating compositions were made by mixing the ingredients in the amounts shown in the table below. The amount of each ingredient the amount of that ingredient as supplied by the supplier, expressed as percent by weight, based on the total weight of that example composition.

| | percent by weight | | | |
|---|---|---|---|---|
| Ingredient | Comparative C | Example 1 | Example 2 | Example 3 |
| Water | 52.68 | 53.18 | 56.68 | 55.38 |
| SE-21 | 0.02 | 0.02 | 0.02 | 0.02 |
| diethylene glycol ethyl ether | 5.00 | 5.00 | 1.40 | 1.40 |
| tributoxy ethyl phosphate | 1.50 | 1.50 | 1.50 | 1.50 |
| Latex polymer X | 8.00 | — | — | — |
| Polymer D1 | — | 7.50 | 7.50 | 7.50 |
| Polymer A1 | 25.00 | 25.00 | 25.00 | — |
| Polymer A2 | — | — | — | 26.40 |

-continued

| Ingredient | Comparative C | Example 1 | Example 2 | Example 3 |
|---|---|---|---|---|
| A-C 350N | 5.20 | 5.20 | 5.20 | 5.20 |
| Carbon Black | 1.60 | 1.60 | 1.60 | 1.60 |
| Nonionic Rheology Modifier | 0 | 0 | 0.2 | 0 |

Example 4

Test Results

The formulations of Examples 1-3 and Comparative C were coated onto leather as described above and tested. The results were as follows:

| Test | Comparative C | Example 1 | Example 2 | Example 3 |
|---|---|---|---|---|
| first coat gloss (Gloss Units) | 36.9 | 37.8 | 35.7 | 32.5 |
| second coat gloss (Gloss Units) | 59.1 | 59.3 | 62.5 | 62.4 |
| third coat gloss (Gloss Units) | 76.1 | 77.7 | 76.5 | 79.7 |
| Leveling | very good | excellent | excellent | excellent |
| Time to Dry (minutes) | 10 to 20 | <10 | <10 | <10 |

The examples show higher gloss, better leveling, and quicker time to dry than the comparative.

We claim:

1. An aqueous composition comprising
   (a) at least one anionically stabilized latex polymer,
   (b) at least one polyfunctional amine,
   (c) at least one volatile base; and
   (d) at least one anionically stabilized latex polymer having Tg lower than 21° C.;
   wherein said polymer (a) has Tg of 21° C. or higher, and wherein said composition further comprises at least one polyvalent metal cation.

2. The composition of claim 1, wherein said polymer (a) is crosslinkable.

3. The composition of claim 1, wherein said polymer (a) comprises as polymerized units 5% or more by weight residues of carboxyl-functional monomer, based on the dry weight of said polymer (a); and wherein said polymer (d) comprises as polymerized units less than 5% by weight residues of carboxyl-functional monomer, based on the dry weight of said polymer (d).

4. A method for coating a substrate comprising the steps, of applying at least one layer of the composition of claim 1 to said substrate and drying or allowing to dry said layer of the composition of claim 1.

5. An article comprising a substrate and a layer of the composition of claim 1.

6. A method for coating leather comprising the step of applying to said leather at least one layer of an aqueous coating composition comprising the composition of claim 1.

7. An article comprising leather coated by the method of claim 6.

8. A method for coating elastomer comprising the step of applying to said elastomer at least one layer of an aqueous coating composition comprising the composition of claim 1.

9. An article comprising elastomer coated by the method of claim 8.

10. The aqueous composition of claim 1, wherein said polyvalent metal ion is selected from the group consisting of polyvalent ions of zinc, polyvalent ions of copper, and polyvalent ions of magnesium.

11. The aqueous composition of claim 1, wherein said anionically stabilized polymer is a liner polymer.

12. The aqueous composition of claim 1, wherein said polymer (a) comprises 0.1% or more residues of (meth)acrylic acid by weight based on the weight of said polymer (a).

13. The aqueous composition of claim 12, wherein said polymer (a) is crosslinkable by the interaction of said (meth)acrylic acid residues with said polyvalent metal cation.

14. The aqueous composition of claim 13, wherein said polymer (a) comprises 2% or more residues of (meth)acrylic acid by weight based on the weight of said polymer (a).

15. The method of claim 6, wherein said polyvalent metal ion is selected from the group consisting of polyvalent ions of zinc, polyvalent ions of copper, and polyvalent ions of magnesium.

16. The method of claim 6, wherein said anionically stabilized polymer is a linear polymer.

17. The method of claim 6, wherein said polymer (a) comprises 0.1% or more residues of (meth)acrylic acid by weight based on the weight of said polymer (a).

18. The method of claim 17, wherein said polymer (a) is crosslinkable by the interaction of said (meth)acrylic acid residues with said polyvalent metal cation.

19. The method of claim 18, wherein said polymer (a) comprises 2% or more residues of(meth)acrylic acid by weight based on the weight of said polymer (a).

* * * * *